United States Patent
Stack et al.

(10) Patent No.: US 6,804,438 B2
(45) Date of Patent: Oct. 12, 2004

(54) METHOD FOR RELAXING MECHANICAL TOLERANCE IN AN OPTO-ELECTRONIC UNIT

(75) Inventors: Richard Stack, Amherst, NH (US); Roger Dugas, Chester, NH (US)

(73) Assignee: Xanoptix, Inc., Merrimack, NH (US)

( * ) Notice: Subject to any disclaimer, the term of this patent is extended or adjusted under 35 U.S.C. 154(b) by 315 days.

(21) Appl. No.: 10/187,240

(22) Filed: Jun. 28, 2002

(65) Prior Publication Data

US 2003/0031417 A1 Feb. 13, 2003

Related U.S. Application Data

(60) Provisional application No. 60/302,582, filed on Jun. 29, 2001, and provisional application No. 60/302,246, filed on Jun. 29, 2001.

(51) Int. Cl.[7] .............................. G02B 6/44; G02B 6/22
(52) U.S. Cl. ............................ 385/52; 385/114; 385/88
(58) Field of Search ............................ 385/52, 114, 88, 385/66, 73, 72

(56) References Cited

U.S. PATENT DOCUMENTS

| | | | | |
|---|---|---|---|---|
| 5,422,970 A | * | 6/1995 | Miller et al. ................. 385/72 |
| 5,433,911 A | * | 7/1995 | Ozimek et al. ............. 264/261 |
| 6,375,365 B1 | * | 4/2002 | Chau ............................. 385/88 |
| 6,379,984 B1 | * | 4/2002 | Sandberg et al. ............. 438/29 |
| 6,406,195 B1 | | 6/2002 | Hammond et al. .......... 385/93 |
| 6,419,405 B1 | | 7/2002 | Boscha ........................ 385/89 |
| 6,442,318 B1 | * | 8/2002 | Goldman .................... 385/114 |
| 2002/0085816 A1 | | 7/2002 | Nishimura ................... 385/88 |
| 2002/0159707 A1 | * | 10/2002 | Mortzheim et al. .......... 385/52 |

OTHER PUBLICATIONS

Aoki, Y., "Parallel and Bi-Directional Optical Interconnect Module Using Vertical Cavity Surface Emitting Lasers (VCSELs) and 3-D Micro Optical Bench (MOB)", *IEEE*, pp. 9 and 10, 1999.

Chou, B. et al., "Multilayer High Density Flex Technology", *IEEE*, pp. 1181–1189, 1999.

Datta, M. et al., A low-cost electroless plating method for producing flip-chip bondable and wire-bondable circuit pads for smart pixel application, *IEEE*, pp. 99–100, 1998.

(List continued on next page.)

*Primary Examiner*—Thien M. Le
(74) *Attorney, Agent, or Firm*—Morgan & Finnegan LLP

(57) ABSTRACT

An optical device has a mating piece constructed to accept and mate with a commercially available optical connector, an optical module, and a spacer located between the mating piece and the optical module, the spacer maintaining the mating piece and the optical module in alignment relative to each other in at least the Z direction and one other direction.

12 Claims, 2 Drawing Sheets

OTHER PUBLICATIONS

Giboney, K.S., "Parallel–Optical Interconnect Development at HP Laboratories", *SPIE*, vol. 3005, pp. 193–201, Feb. 1997.

Goldstein, J. et al., "Fluxless Flip–Chip For Multichip Modules", *IEEE*, pp. 39–43, 1996.

Imler, B. et al., "Precision Flip–Chip Solder Bump Interconnects for Optical Packaging", IEEE Electronic Components and Technology Conference, pp. 508–512, 1992.

Maj, T. et al., "Interconnection of a two–dimensional array of vertical–cavity surface–emitting lasers to a receiver array by means of a fiber image guide", *Applied Optics*, vol. 39, No. 5, pp. 683–689, Feb. 10, 2000.

McLaren T. et al., "Assembly of VCSEL Based Smart Pixel Arrays", IEEE/LEOS Summer Topical Meeting: Smart Pixels, pp. 49 and 50, Aug. 1996.

Ohki, A. et al., "Multi–channel optical coupling between VCSEL arrays and multimode opticle fibers for a 40–channel parallel optical interconnection module", *IEEE*, pp. 47 and 48, 1998.

Ohsaki, T., "ELectronic Packaging in the 1990's –A Perspective From Asia", *IEEE Transactions On Components, Hybrids, And Manufacturing Technology*, vol. 14, No. 2, pp. 254–261, Jun. 1991.

International Search Report dated Oct. 28, 2002.

* cited by examiner

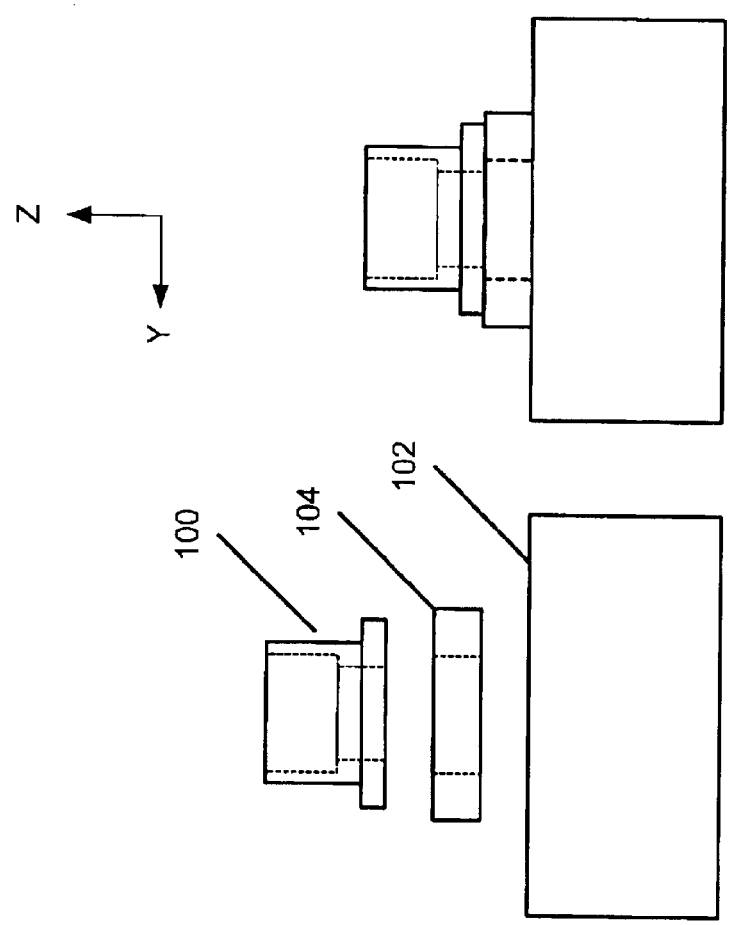

METHOD FOR RELAXING MECHANICAL TOLERANCE IN AN OPTO-ELECTRONIC UNIT

CROSS REFERENCE TO RELATED APPLICATIONS

This application claims priority under 35 USC 119(e)(1) of U.S. Provisional Patent Application Serial No. 60/302,582 and U.S. Provisional Patent Application No. 60/302,246 both filed Jun. 29, 2001.

FIELD OF THE INVENTION

This invention relates to optical connectors and, more particularly, to reducing optical coupling errors introduced by lack of precision in the connector parts used.

BACKGROUND

Typically, connectors used in fiber optics are keyed and formed to snap together in a very precise way to ensure that light is properly coupled between the two sides of the connectors and to minimize losses. As a result, the tolerances of the individual components before, and after, assembly is very important.

In the case of connectors, the connectors typically mounts onto a mating part that, for example, is mounted on a module in a precise way and the connector either 'snaps' onto the mating part to self lock (and may be easily removable) or it is crimped onto the mating part. Often, the mating part is manufactured to a particular specification so that connectors of a particular type, typically from other manufacturers, can connect to it.

The snapping type mating part typically requires high precision in its design, placement and attachment, as well as most, if not all, other critical components on the mating side. If the mating part lacks the requisite precision in either its manufacture or placement, it can cause a misalignment which, in the particular case, may still be acceptable, may be wholly unacceptable, or may be somewhere in between, depending upon the particular application in which it is being used.

The crimping type mating part has the same problems and further, is subject to the introduction of errors in alignment during crimping.

Moreover connectors are typically crimped or epoxied in a manner which may allow for adjustment in the X or Y planes, but provides little or no flexibility in adjusting for imprecision in the Z direction (i.e. the distance along the direction the connector is typically inserted) or for inaccuracies in "roll", "pitch" or "yaw".

In either case, this variability leads to increased cost, both in labor and materials, because the tolerance error in any two given pieces may be within their respective specifications but their combined errors are sufficiently great so as to cause problems in mating or with the efficiency of the coupling of light. Thus, even if such problems are not fatal to use of the components, they may nevertheless adversely affect performance and/or reliability.

SUMMARY OF THE INVENTION

We have recognized the above problems and created a way to:

1) ensure that the mating part to which connectors are attached are put on with high alignment precision,
2) ensure mating parts are secured permanently (absent unusual circumstances) on a module, and
3) allows flexibility in at least the three dimensions so as to reduce the precision required on pieces inside the connector and/or the mating part.

In general, the invention relates to the integration of connectors. More particularly, we have devised an optical connector mating unit, that can be mounted on another component, for example, an opto-electronic module, in a way that provides for high alignment accuracy between the two while reducing the accuracy requirements needed for those parts while ensuring that a good connection between an optical connector and the other component will be created.

Depending upon the particular implementation, our approach may have one or more of a number of advantages, including simplicity of manufacture, significantly lower tolerance on parts for connection, real-time flexibility on distance in the 'Z' dimension, flexibility in roll, pitch or yaw positioning, and an ability to compensate for slight variations in individual components on which the mating portion is mounted or to which the mating portion connects.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIGS. 3A–3C collectively show one example of a process in accordance with the teachings of the invention.

DETAILED DESCRIPTION

Figures 1, 2:
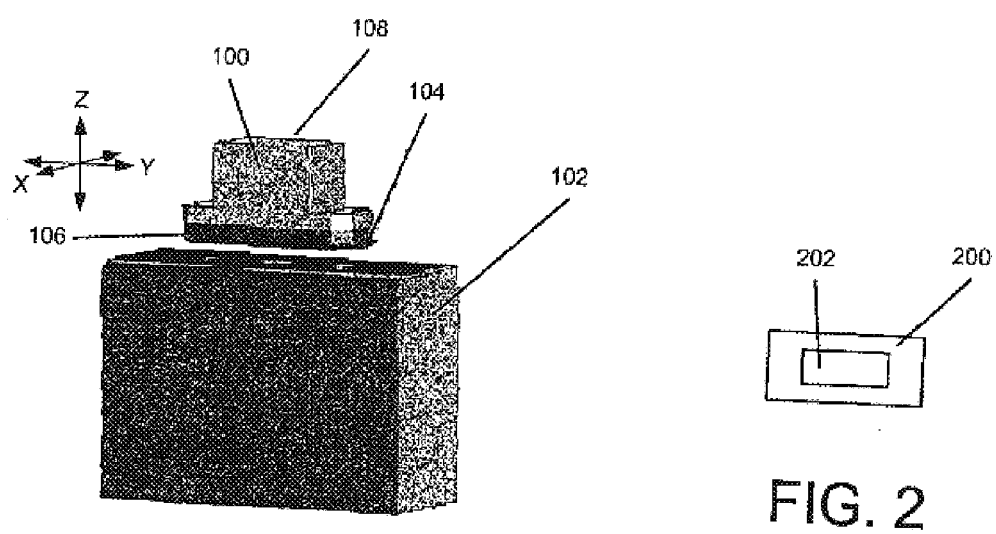
FIG. 1 shows, in perspective view, a mating portion of a connector, a module onto which the mating portion will be mounted, and a flexible spacer, all relative to a common set of X, Y, and Z axes.
FIG. 2 shows one example flexible spacer.

In overview, we use a flexible spacer layer between the mating portion and the component on which the mating portion will be mounted. This allows the easy positioning of the mating portion in all three (X, Y and Z) dimensions. The positioning in the X and Y direction being facilitated by the initial moveability of the spacer within the X-Y plane, and the positioning in the Z direction being facilitated by the flexibilty/compressibility of the spacer layer.

In one variant, the spacer layer is porous to provide a matrix into which an epoxy or other bonding agent can be applied, once the mating portion is aligned in the X, Y and Z directions, and then cured to permanently affix the mating portion to its mounting site, for example a location on an opto-electronic module. In another variant, the spacer layer is non-porous and the epoxy or other bonding agent is flowed around the spacer and hardened or cured to hold it in place. This permits any coupling elements inside the connector and behind the mating portion to be placed with far less accuracy, since only the final alignment involving the two pieces and the spacer need be precise.

As a result, because of the range of movement afforded by the flexible spacer, the accuracy of the connector or any alignment elements on either the connector or the module need not be precise. As long as the accuracy is such that the two pieces can be aligned relative to each other, for example, the connector can be aligned relative to the module, within the range of movement in the X, Y and Z direction the two pieces can be accurately aligned and attached. In addition, this approach allows for adjustments to also easily be made in roll, pitch and/or yaw as necessary as part of the process. This addresses a problem inherent in the prior art, in that if the pieces to be mated were individually or when combined collectively out of specification due to variances in roll, pitch or yaw, the time and labor cost of correcting for such errors typically exceeded the cost of the parts such that they were either scrapped or salvaged through trial and error attempts with other parts on an ad hoc basis.

Thus, our arrangement simplifies the manufacturing of product by only requiring one high precision step, this alignment step. In addition, our approach reduces the need to purchase parts made to extremely high accuracy (thereby reducing costs), reduces the likelihood that slightly out-of-specification parts will be rendered unusable, and/or reduces the costs associated with attempts to use slightly out-of-specification parts.

Referring now to the figures, FIG. 1 shows a mating portion 100 of a connector, a module 102 onto which the mating portion will be mounted (which can include any of an optical receiver, an optical transmitter, or an optical transceiver), and a flexible spacer 104, all relative to a common set of X, Y, and Z axes. As shown, the flexible spacer has a thickness 106 that provides an ample range of motion in the X, Y directions through shearing flex, motion in the Z direction based upon compressibility in the Z direction, and for roll, pitch and or yaw pivoting, due to the ability to twist or compress the spacer rotationally about the X, Y and/or Z axes as required to achieve the desired alignment.

Depending upon the particular implementation, the mating portion 100 will typically be constructed and shaped on a portion 108 to accept and mate with a commercially available optical connector, such as connectors of the commonly available commercial ST, LC, MT-RJ, MTP®, MPO, MPX and SMC styles, to name a few examples.

FIG. 2 shows one example flexible spacer 200 having a square 200 hole to allow for part of the connector and/or light signals to pass and thereby allow for optical access between the connector and module 102.

One material suitable for use as the flexible spacer is commercially available from Minnesota Manufacturing and Mining Co. (3M) under the name 3M Silicone Rubber Tape Model S8020T-031A. An epoxy usable as the bonding agent in conjunction with the 3 m flexible spacer material is the EP65HT-1 epoxy commercially available from Master Bond Inc., 154 Hobart St., Hackensack, N.J. 07601.

FIGS. 3A–3C collectively show one example of a process in accordance with the teachings of the invention that used two pieces of reduced tolerance and a flexible spacer as shown in connection with FIG. 2, using a module 102 onto which the mating piece 100 will be mounted. FIG. 3A shows each of the pieces 100, 102, 104 after the mating piece and module have been aligned in the X, Y, roll, pitch and yaw directions.

FIG. 3B shows the pieces of FIG. 3A 100, 102, 104 after they have been brought together following alignment in all but the Z direction. FIG. 3C shows the pieces 100, 102, 104 of GIG. 3B after alignment in the Z direction and bonding together to form an integrated and aligned unit 300. There are many ways for aligning the two pieces.

For example, in the case of a fiber optic connection, a connector coupled to a constant light source can be connected to the mating piece and photodetectors in the module can be enabled and the incident light level detected by the photodetectors is monitored. The two pieces are moved relative to each other in the X, Y, Z, roll, pitch and yaw directions until the incident light detected by the photodetectors is maximized.

An alternative method, uses a high precision jig that holds each of the two pieces. A partially transparent alignment standard having alignment marks common to both pieces is placed between the two pieces. A camera is brought between one piece and the standard so that the other piece can be viewed through the standard. The other piece is then aligned relative to the standard. Next, the camera is moved to between the other piece and the standard and the first piece is aligned relative to the standard. Once this is done, the pieces are aligned in all but the Z direction. The standard is then removed and the pieces are brought together and aligned solely in the Z direction using, for example, the light method described above.

An another alternative method for alignment is shown in commonly assigned U.S. Provisional Patent Application Serial No. 60/302,246 and U.S. Patent Application filed Jun. 27, 2002 both entitled "Simple Deterministic Alignment Method for Array Based Optical Component Packaging", incorporated herein in their entirety by reference.

We turn now to a specific detailed example in accordance with the teachings of the invention with reference to FIGS. 3A–3C. For simplicity, the actual alignment method used will not be discussed in detail in this example, since the use of different methods of determining exactly when the pieces are in alignment will not typically materially alter the process as described. Rather, this simple explanation will provide the necessary details for an understanding of the invention as defined by the claims annexed hereto.

First, as noted above, the module 102 and the mating piece 100 are each held in precision holders that allow for precision adjustment in at least the X, Y and Z direction, and, in some more commercially suitable variants, optionally in each of the 6 degrees of movement (X, Y, Z, roll, pitch and yaw).

The two pieces are then aligned in the X and Y directions and, if necessary and/or desired and/or available, for rotation in the XY plane (i.e. about the Z axis).

Then the mating piece 100 is moved in the Z direction until the mating piece 100 is in contact with a flexible spacer, for example the flexible spacer of FIG. 2, that is, in turn, in contact with the module 102.

At this point, the mating piece is moved in the Z direction, and the spacers compressed, until the connector is the exact height required to optimize the coupling of light through that particular connector piece is obtained. If possible and desired or necessary, the mating piece 100 is also moved in rotation about one or both of the X and Y axes. Depending upon the particular case, the pitch and/or yaw adjustment, if made, can be made before the Z alignment is complete or after it is complete. Of course, the Z, pitch and/or yaw alignment can be done concurrently, although such an approach may not be desirable in particular instances.

Advantageously, this apparatus and approach allows for minor manufacturing variations between mating pieces and/or modules in a manufacturing run to be accounted for.

Once the Z direction distance, and if used, rotation in the XZ, XY and YZ planes, is established, an epoxy or other bonding agent is flowed around, or, in the case of a porous spacer, into the spacer. The epoxy or bonding agent is then allowed to harden or is cured to hold the pieces in place permanently.

Once this is done, the alignment between joined pieces will be fixed, absent destructive or detrimental circumstances not relevant to understanding the invention.

As a result, by using the principles of the invention, the mating piece and the optical module can be aligned relative to each other in the X, Y and Z directions and in roll, pitch and yaw, to an accuracy that is greater, in one or more of the roll, pitch and yaw directions than could be achieved if the mating piece and the optical module were directly abutting each other without the flexible spacer in between.

It should also be understood that, in different variants, the alignment in the Z direction can precede the alignment in the X and/or Y direction. Similarly, adjustment of alignment in roll, pitch and/or yaw can occur before, during or after any of the above, the only requirement being that the flexible spacer must be interposed between the two pieces prior to final alignment in the Z direction (i.e. along the Z axis).

Moreover, in other variants, a physical feature located on one or both of the two pieces to be mated can be used to establish one or both of the X and Y direction alignment. In such variants, alignment using the spacer need only be performed in the Z direction and the other non aligned directions. For example, if a physical feature establishes accurate alignment in the X direction, alignment in the Y and Z directions, and if desired and possible, in roll pitch and/or yaw need be performed. The analogous circumstances apply for the other non-Z alignments.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. An optical unit comprising:
    a mating piece, having a first imprecision in tolerance;
    an optical module to which the mating piece is joined, the optical module having a second imprecision in tolerance;
    a spacer, located between the mating piece and the optical module and contacted by each of the mating piece and optical module, the spacer being compressed between the mating piece and the optical module so as to allow for a proper alignment between the mating piece and the optical module by compensating for at least one of the first imprecision or the second imprecision while providing for optical access between the mating piece and the optical module.

2. The optical unit of claim 1 wherein the spacer is a porous spacer.

3. The optical unit of claim 1 further comprising a glue holding the mating piece, the optical module and the spacer in a fixed position.

4. The optical unit of claim 1 wherein the mating piece and the optical module are aligned relative to each other in the X, Y and Z directions and in roll, pitch and yaw, to an accuracy greater, in at least one of the roll, pitch or yaw directions than would exist if the mating piece and the optical module were directly abutting without the spacer.

5. A method of providing for proper alignment between a mating piece and an optical module comprising:
    a) aligning the mating piece relative to the optical module in the X-Y plane;
    b) interposing a flexible spacer between the mating piece and the optical module, the flexible spacer being constructed so as not to inhibit a passage of optical signals between the mating piece and the optical module;
    c) causing a contacting of the flexible spacer with both the mating piece and the optical module;
    d) aligning the mating piece relative to the optical module in the Z direction; and
    e) affixing the mating piece, the flexible spacer and the optical module together.

6. The method of claim 5 further comprising:
    f) aligning the mating piece relative to the optical module in at least one of roll, pitch or yaw.

7. The method of claim 6 wherein f) occurs before d) but after a).

8. The method of claim 6 wherein f) occurs before a).

9. The method of claim 6 wherein f) occurs after d) but before e).

10. The method of claim 5 wherein c) occurs before a).

11. An optical device comprising:
    a mating piece constructed to accept and mate with a commercially available optical connector;
    an optical module; and
    a spacer located between the mating piece and the optical module, the spacer maintaining the mating piece and the optical module in alignment relative to each other in at least the Z direction and one other direction.

12. The optical device of claim 11 wherein the mating piece is constructed to accept one of an ST, LC, MT-RJ, MTP®, MPO, MPX or SMC style connector.

* * * * *